May 15, 1951  M. POIRIER  2,552,690
VEHICLE WHEEL SUSPENSION
Filed March 28, 1947  4 Sheets-Sheet 1
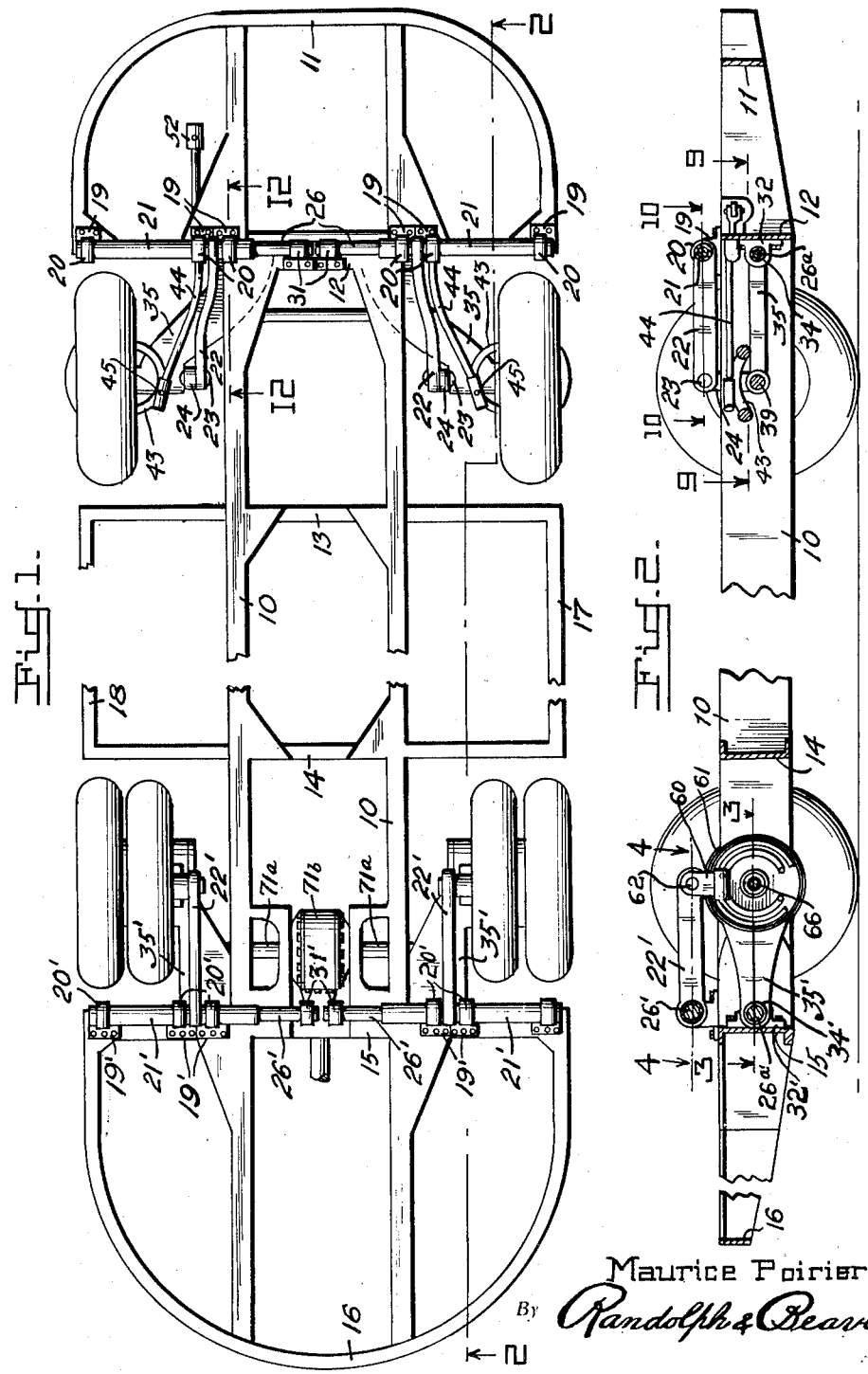
Inventor
Maurice Poirier
By Randolph & Beavers
Attorneys May 15, 1951 M. POIRIER 2,552,690
VEHICLE WHEEL SUSPENSION
Filed March 28, 1947 4 Sheets-Sheet 2
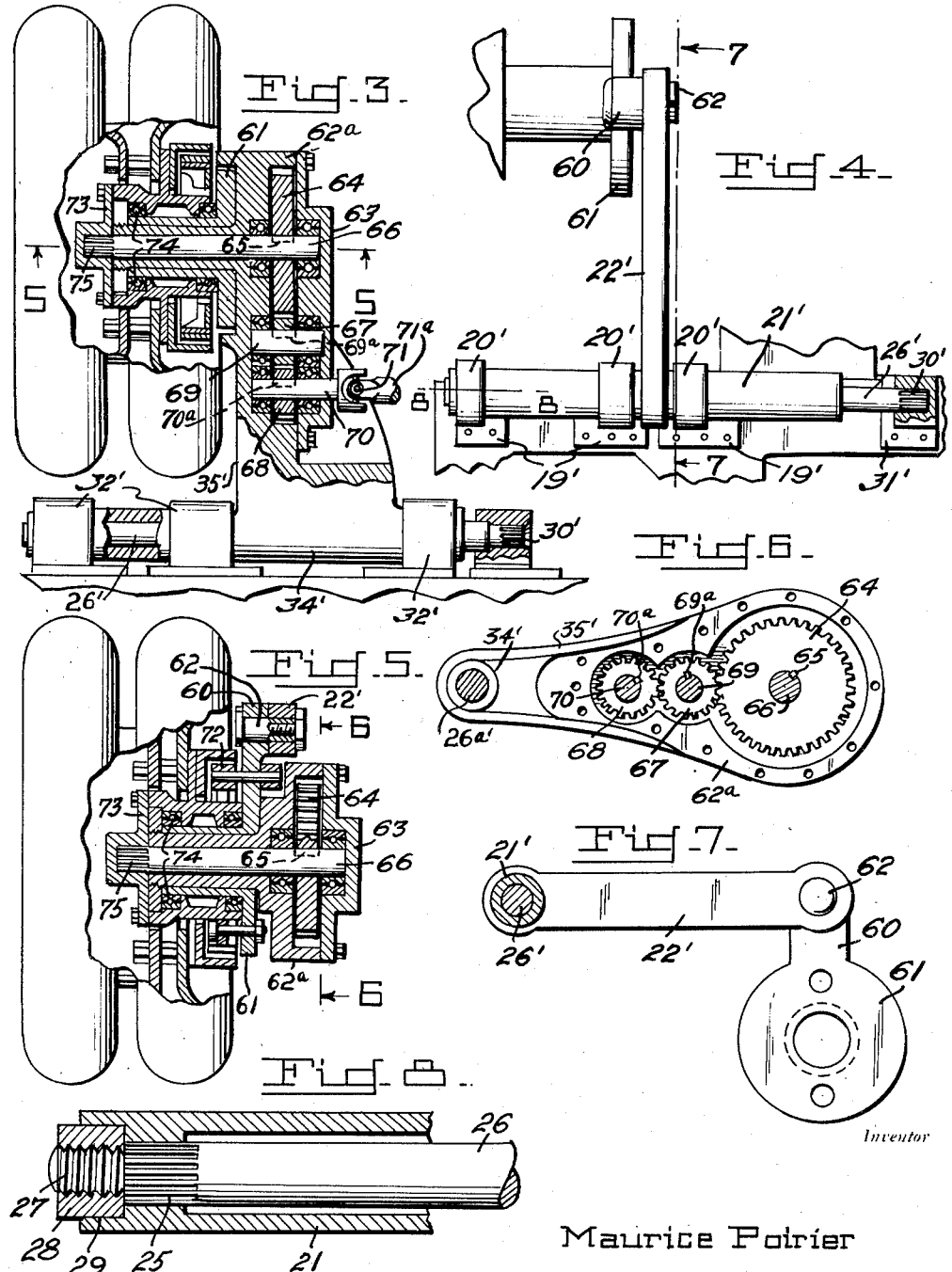
Inventor
Maurice Poirier
By Randolph & Beavers
Attorneys

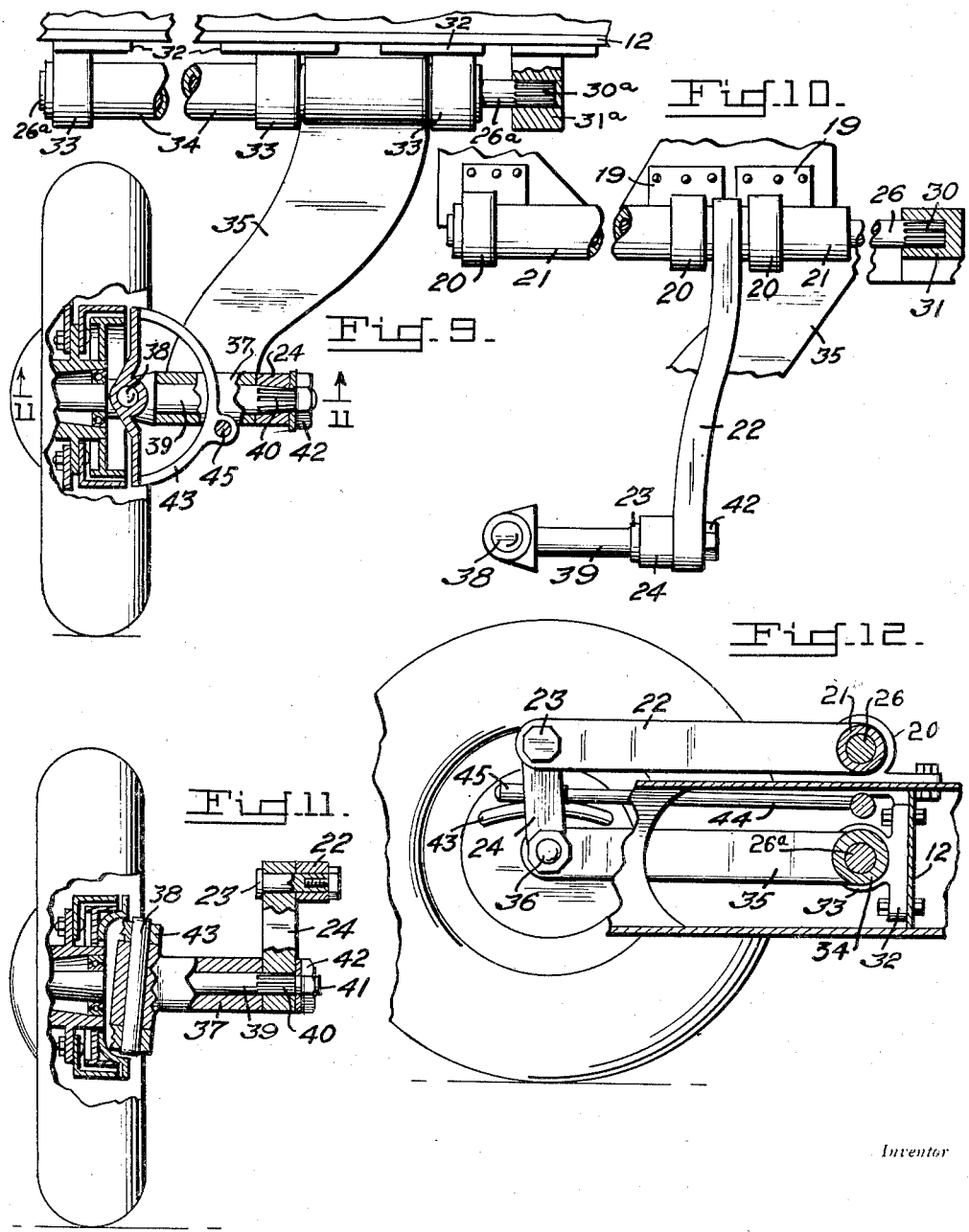

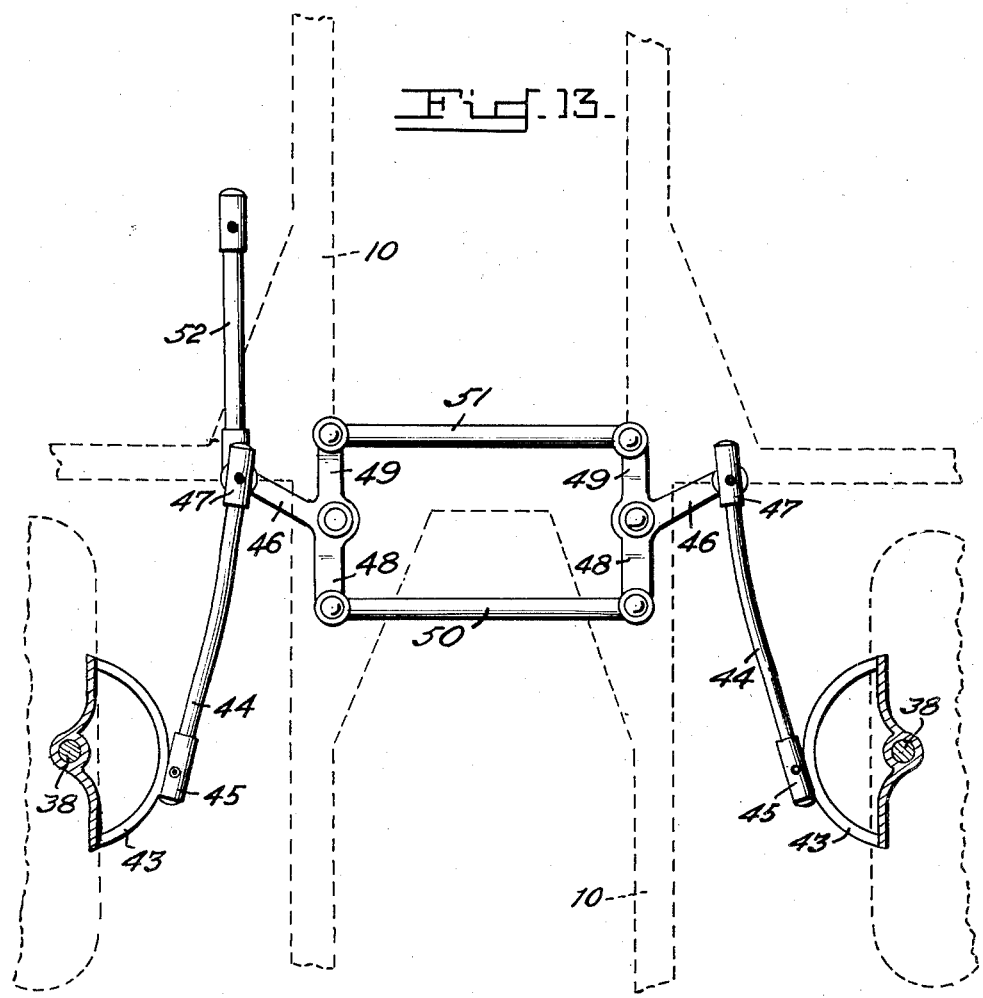

Patented May 15, 1951

2,552,690

UNITED STATES PATENT OFFICE 2,552,690

VEHICLE WHEEL SUSPENSION

Maurice Poirier, Burbank, Calif.

Application March 28, 1947, Serial No. 737,864

2 Claims. (Cl. 180—73)

The present invention relates to improvements in vehicle wheel suspension and it consists in the combinations, constructions and arrangements of parts hereinafter described and claimed.

It is an object of the invention to provide an improved structure of the general nature disclosed in my former patents, No. 2,110,819, patented March 8, 1938, and 2,062,233, patented November 24, 1936.

It is an object of the invention to provide means for the independent suspension for each of the wheels of a motor vehicle and means for maintaining the alignment of the wheels with the frame of the vehicle.

Another object of the invention is to provide a suspension for motor vehicle which is adaptable for rear or front engine drive and which will provide a desirable and substantial means for driving the wheels and for reducing the torque on the universal joints by reducing the angle of vertical travel of the driving wheels when obstructions in the road are encountered.

A further object of the invention is the provision of novel means for imparting motion to the driving wheels which will provide a great reduction in wear and tear on the universal joints due to the novel location of the driving pinion gear.

A further object of the invention is the location of a driving pinion gear at a point about half-way between the center of the driven wheel and the radius point of a suspension arm pivoted to the chassis frame.

A further object of the invention is the provision of a vehicle wheel suspension adaptable for use with a rear engine drive.

Other and further objects of the invention will become apparent from a reading of the following specification taken in conjunction with the drawings in which:

Figure 1 is a fragmentary plan view of a vehicle with body removed and provided with an embodiment of the invention, Figure 2 is a sectional view taken along line 2—2 of Figure 1, Figure 3 is an enlarged sectional view taken substantially along line 3—3 of Figure 2, Figure 4 is an enlarged plan view, partly in section, disclosing certain details of construction and taken on the line 4—4 of Figure 2, Figure 5 is a sectional view taken substantially along line 5—5 of Figure 3, Figure 6 is a sectional view taken substantially along line 6—6 of Figure 5, Figure 7 is a sectional view taken substantially along line 7—7 of Figure 4, Figure 8 is an enlarged sectional view taken along line 8—8 of Figure 4, Figure 9 is an enlarged sectional view taken substantially along line 9—9 of Figure 2, Figure 10 is an enlarged fragmentary view taken substantially along line 10—10 of Figure 2, Figure 11 is a sectional view taken substantially along line 11—11 of Figure 9, Figure 12 is an enlarged fragmentary sectional view taken substantially along line 12—12 of Figure 1, and Figure 13 is a phantom plan view illustrating certain details of the invention.

Referring more particularly to the drawings, there is shown therein a vehicle provided with a suitable chassis having longitudinally extending side beams 10 spanned by cross beams 11, 12, 13, 14, 15 and 16 which extend transversely to interconnect outside beams 17 and 18 which latter form the contour of the outside of the vehicle.

To the cross beam 12 is attached a series of upper brackets 19 which are provided with bearings 20 in which are mounted a pair of tubular members 21 to which is affixed a pair of upper torque arms 22, the outer ends of which are pivotally connected as indicated at 23 to links 24.

The tubular members 21 each have splined at their outer ends as indicated at 25 in Figure 8 a torsion rod 26 which has formed thereon at its outer end a threaded portion 27 which is adapted to receive a nut 28 which partially fits within a recess 29 in the end of the tubular member 21. The inner ends of the torsion rods 26 are splined as indicated at 30 to a splined bracket 31 which is attached to the cross beam 12.

To the underside of the cross beam 12 is attached a series of lower brackets 32 carrying bearings 33 within which is revolubly mounted a pair of lower cylindrical members 34 to each of which is affixed a lower torque arm 35. It will be seen that the cylindrical members 34 are provided with torsion rods 26a which are splined as shown at 30a to a splined bracket 31a which is mounted upon the cross beam 12.

The lower torque arm 35 extends horizontally and is pivotally attached as indicated at 36 to the lower end of links 24. This pivotal connection is formed by having the outer ends of the arms 35 terminate in housing 37 which are adapted to contain kingpins 38 and kingpin axles 39, said axles are splined on their inner ends as indicated at 40 to the links 24 and protrude therethrough and terminate in threaded ends 41 which are adapted to receive nuts 42. Semicircular horizontally extending brackets 43 are pivotally mounted about the kingpins 38 and are pivotally connected to steering links 44 as indicated at 45. The links 44 are adapted to be moved by means of Y-shaped members 46 to which they are pivotally connected as indicated at 47 each to an outwardly extending arm thereof. The outer ends of each of the inner arms 48 and 49 of the Y-shaped member are interconnected by transversely extending link members 50 and 51, respectively. An operating link 52 is pivotally connected to one of the outwardly extending arms of the Y-shaped member 46.

The descriptive matter above refers to the suspension of the front wheels of a vehicle and to the steering mechanism therefor. The suspension and other matters relating to the rear wheels will now be described. Where identical parts are shown with relation to the rear wheels they will be given identical but primed reference characters with those hereinabove set forth with relation to the front wheels.

It will be seen that the upper torque arms 22' are pivotally connected with upwardly extending arms 60 of brake housings 61, as indicated at 62, and that the lower torque arms 35' are affixed to tubular members 34', as indicated in Figure 3. These torque arms 35' have their free ends designed to accommodate the brake housings 61 on the outer side and gear housings 62a, best illustrated in Figures 5 and 6. The gear housings are provided with covers 663 and are each adapted to encompass a large gear 64 keyed, as indicated at 65, to an axle 66. Enmeshed with the gear 64, in each case, is a gear 67 which is, in turn, enmeshed with a similar gear 68. The gear 67 is keyed to a stop shaft 69, as indicated at 69a, and the gear 68, keyed to shaft 70 as indicated at 70a, protrudes through the cover 63 and is connected by means of a universal joint 71 and shafts 71a to a suitable source of power or differential 71b. A brake cam 72 may be operatively connected to air, hydraulic or electric means for actuating the same. The rear wheels are provided with hubs 73 which are adapted to rotate upon the outer sides of the brake housings 61 on suitable bearings 74 and the hubs are splined to the outer ends of the shafts 66 as indicated at 75.

In operation, it will be seen that both the front and rear wheels are provided with upper and lower torque arms and that the principle of operation with regard to both the front and the rear wheels is identical. The torsion rods 26a and 26a' may be easily removed from the cylindrical members 34 and 34' and cleaned, repaired, or replaced.

It will also be apparent that the upper and lower torque arms are constructed so that they will at all times be parallel to one another and that in the case of the steering linkage, this linkage is designed to travel upwardly and downwardly along with the upper and lower torque arms 22 and 35, respectively. In each case the upper torque arms serve to absorb the braking torque as well as providing a means for suspending the wheels.

Again, it will be noted that the caster angle of the kingpins 38 is controlled by means of the link 24 and its connection with the axle 39.

It will also be seen that brake torque will be taken up by the torque arms 22 and 22' without imparting any of the torque to the lower torque arms 35 and 35', which latter are designed to provide the principal means of support for the wheels.

It will also be seen that the means for driving the wheels is especially novel, since it provides a great reduction in wear and tear on the universal joints by using a gear reduction between the universal joints and the wheels. The vertical travel of the driving axle is greatly reduced, due to the location of the driving pinion 68 which is located at a point about half-way between the center of the suspension arm 35' which is pivoted to the frame of the chassis.

While but one form of the invention has been shown and described herein, it will be readily apparent to those skilled in the art that many minor modifications may be made without departing from the spirit of the invention or the scope of the appended claims.

What is claimed is:

1. A vehicle wheel support comprising in combination with a vehicle chassis, an upper and a lower series of brackets carried by the chassis, an upper transversely extending cylindrical member revolubly mounted in said upper series of brackets and a lower transversely extending cylindrical member revolubly mounted in said lower series of brackets, a torsion rod mounted within each cylindrical member, each of said rods being permanently attached at one end thereof to the corresponding cylindrical member, the other end of each of said rods protruding through the other end of each of said corresponding cylindrical members and affixed to the chassis, a torque arm affixed at one end thereof to the cylindrical member mounted in the upper series of brackets, a brake housing attached to the free end of said torque arm, a wheel revolubly mounted on the brake housing, a lower torque arm comprising a gear housing and affixed at one end thereof to the lower cylindrical member, a drive shaft for the wheels mounted in the lower torque arm, gears mounted in the gear housing and operatively connected to the drive shaft, and power means on said chassis and drivingly connecting said gears for imparting motion to said gears whereby said shaft and said wheel is driven.

2. A vehicle wheel support comprising in combination with a vehicle chassis, an upper and a lower series of brackets carried by the chassis, an upper transversely extending cylindrical member revolubly mounted in said upper series of brackets and a lower transversely extending cylindrical member revolubly mounted in said lower series of brackets, a torsion rod mounted within each cylindrical member, each of said rods being permanently attached at one end thereof to the corresponding cylindrical member, the other end of each of said rods protruding through the other end of each of said corresponding cylindrical members and affixed to the chassis, a torque arm affixed at one end thereof to the cylindrical member mounted in the upper series of brackets, a brake housing attached to the free end of said torque arm, a wheel revolubly mounted on the brake housing, a lower torque arm comprising a gear housing and affixed at one end thereof to the lower cylindrical member, a drive shaft for the wheels mounted in the lower torque arm, gears mounted in the gear housing and operatively secured to said shaft, power means mounted on said chassis, and universal connection between the gears and said power means whereby the power means are adapted to drive said gears.

MAURICE POIRIER.

(References on following page)

REFERENCES CITED

The following references are of record in the file of this patent:

UNITED STATES PATENTS

| Number | Name | Date |
|---|---|---|
| 2,024,199 | Barnes et al. | Dec. 17, 1935 |
| 2,075,041 | Kliesrath | Mar. 30, 1937 |
| 2,102,923 | Szekely | Dec. 21, 1937 |
| 2,132,759 | Rabe | Oct. 11, 1938 |
| 2,160,862 | Hickman | June 6, 1939 |
| 2,256,069 | Wagner | Sept. 16, 1941 |

FOREIGN PATENTS

| Number | Country | Date |
|---|---|---|
| 618,071 | Germany | Aug. 31, 1935 |
| 622,994 | Germany | Dec. 11, 1935 |
| 800,841 | France | May 11, 1936 |